United States Patent
Fonseca

[11] Patent Number: 5,919,010
[45] Date of Patent: Jul. 6, 1999

[54] APPARATUS FOR FORMING INSPECTION OPENINGS IN ASBESTOS INSULATION CLADDING

[76] Inventor: Roberto Fonseca, 10838 Magnolia Blvd. #113, North Hollywood, Calif. 91605

[21] Appl. No.: 09/075,143

[22] Filed: May 8, 1998

[51] Int. Cl.⁶ .................................................... B23B 47/34
[52] U.S. Cl. ................................ 408/67; 408/61; 408/68
[58] Field of Search ................. 408/67, 68, 56, 408/61, 202, 204, 206, 207

[56] References Cited

U.S. PATENT DOCUMENTS

| | | | |
|---|---|---|---|
| 4,037,982 | 7/1977 | Clement | 408/67 |
| 4,519,732 | 5/1985 | Sutcliffe | 408/61 |
| 4,917,547 | 4/1990 | Frederickson et al. | 408/61 |
| 4,921,375 | 5/1990 | Famulari | 408/67 |
| 5,113,951 | 5/1992 | Houben et al. | 408/67 |
| 5,213,454 | 5/1993 | Givler et al. | 408/67 |
| 5,292,210 | 3/1994 | Nowick | 408/67 |

FOREIGN PATENT DOCUMENTS

| | | | |
|---|---|---|---|
| 132405 | 8/1983 | Japan | 408/67 |

*Primary Examiner*—Daniel W. Howell
*Attorney, Agent, or Firm*—Michael Bak-Boychuk

[57] ABSTRACT

An evacuated enclosure is provided around a circular cutter to collect the cutting dust produced while forming inspection apertures in insulation cladding. The enclosure includes an upper and lower coaxial chamber, the upper chamber provided with an air pump geared to a rotary shaft from a hand tool that also extends into the lower chamber. The hole cutter at the end of the shaft is then advanced through the insulation cladding by the advancement of the shaft through the cover, and the withdrawal stroke removes the cut pluc from the hale cutter while a spray of fixative is released into the enclosure. This fixative coats the loose strands on the plug exterior and also collects on the filter elements, to fix hazardous dust like asbestos from dispersal. The assembly may be combined with a portable power unit which may also include a vacuum device to augment the air draw across the filter. At the same time the lower chamber may be covered over its interior surfaces by a disposable fibrous liner for collecting the cutting deris thereon. The filter element and the liner can then be disposed following each use.

9 Claims, 2 Drawing Sheets

APPARATUS FOR FORMING INSPECTION OPENINGS IN ASBESTOS INSULATION CLADDING

BACKGROUND OF THE INVENTION

1. Field of the Invention

The present invention relates to hole cutting devices, and more particularly to powered hole cutters enclosed in a suction chamber for collecting the cutting dust in the course of forming an inspection aperture in asbestos insulation cladding.

2. Description of the Prior Art

For some time containment vessels were covered with insulative layers including asbestos. The fire resistive qualities of asbestos, its availability in nature, and the insulative qualities all combined to a preference, and large numbers of storage tanks and vessels are now insulated with asbestos cladding. Until now the exterior skin of the cladding served as a containment mechanism, and as the carcinogenic aspects of asbestos became known this exterior skin structure served as the excuse and attenuation of the public concern over the health hazards of this earlier practice.

Nonetheless, the maturation process of of tank structures brought with it the processes of corrosion, and concern over the integrity of the vessel wall is now at the forfront. For this reason a variety of techniques have been devised in the art to form acces openings in the insulation cladding, including those exemplified in the teachings of U.S. Pat. No. 5,010,926 to Kurth et al, and others. While suitable for the purposes intended, these and the other references deal with the structure of the aperture itself, but fail to address the health risks to those engaged in the forming of the aperture. More precisely, the release to the surrounding environment of the asbestos particulate debris in the course of forming the aperture has had little attention, a release that poses some risks to the employees engaed in the task.

For example, Cal/OSHA interfaces with the General Industry Safety Orders [GISO] setting out comprehensive standards governing work with asbestos, [GISO 5208]. These are then complkemented with various labor codes, e.g., California Labor Code Sections 6501.5 et seq. Thus extensive regulatory enactments are in place, that need corresponding accomodation in the tools utilized.

At the same time, various structures and techniques have been devised in the art for collecting the cutting dust in the course of powered shaping and forming of structures. Typically such collection mechanisms take the form of an evacuated collection enclosure surrounding the cutting tool end, and an evacuation pump to draw the cutting dust from the enclosure onto a filter. Examples of such prior art mechanisms may be found in U.S. Pat. Nos. 5,292,210 to Nowick; 4,968,189 to Pidgeon; 4,921,375 to Famulari; and 3,033,298 to Johnson; German patent DE 3,126,511 A1 to Buschbaum; German patent DT 2,453,791 to Bengt; French patent 916,861; and British patent 2,096,030 to Rohm. Each of the foregoing, while suitable for the purposes intended, fails to address the pernicious nature of asbestos, and the health risks posed thereby.

A technique controlling the release of the particulate matter, and the consequent potential of the inhalation or absorption thereof, is therefore desired and it is one such technique that is described herein.

SUMMARY OF THE INVENTION

Accordingly, it is the general purpose and object of the present invention to provide an aperture cutting tool that includes a reduced pressure enclosure for collecting the particulate matter developed in cutting.

Other objects of the invention are to provide a powered aperture cutter that can be preset in the depth of the cut thereof.

Yet further objects of the invention are to provide a powered hand tool in which the cutting portion is enclosed in a negative pressure cavity evacuated to collect the particulate matter generated in the course of powered use.

Further objects of the invention are to provide an evacuation stream around a powered tool for collecting the debris generated in the course of use.

Briefly, these and other objects are accomplished in the present invention by providing a manually held source of rotary power, such as a hand drill, with an end frame surrounding the power output and conformed to align the power axis orthogonally to the surface that is to be worked. The same end frame, moreover, may be provided with a resilient seal at the contacting edge to make an impervious sealing contact with the surface that is cut.

The power chuck surrounded by the end frame receives a hole cutter assembly, formed as a cylindrical saw blade with abrasive exterior surface, the hole cutter assembly then providing the cutting mechanism for forming the inspection aperture through the cladding. To control the depth of cut, the rotary output of the power source is provided with an adjustable collar and the frame is engaged in a sliding engagement to allow concurrent advancement onto the power source. Thus the cutting stroke, terminated by the advancement of the shaft into the frame until abutting contact is made with the collar, is accompanied by the translation of the frame over the power source.

The upper portion of the cage, in turn, is segmented to form a sealed chamber, generally coaxial with the shaft and including a central drive gear keyed thereto. An offset set of interleaved vanes is then geared to the drive gear to form a suction pump evacuating the interior of the frame. The suction pump then discharges its gas output into a filter housing in which a filter element is retained.

The frame, furthermore, includes a plurality of pivotal members extending therethrough to engage a ring opposing the withdrawal. The member ends pivot onto valve bodies on dispensers, releasing the fixative into the cage interior by the withdrawal flexure of the ring which also ejects the plug from the cutting tool.

In this manner a fixative spray is released into the frame interior while the cutter and the cut plug therein are withdrawn, coating the plug and also the filter element to fix any loose particulate matter. Thus in a single sequence the shavings and particulate matter generated in the course of a cut are evacuated onto a filter element, the cut surfaces are fixed by the fixative spray, and the filter element is also fixed. As result all inadvertent release of asbestos particulate is minimized, both from the cut surfaces and from the filter.

The foregoing structure may be stored for transport within a portable case which also includes a battery and a battery driven vacuum device. In this form the device may be rendered operative in remote locations where electrical power is not available. The same source of battery power may be useful to augment the level of vacuum draw across the filter element by way of a suction hose connection between the exhaust side of the filter housing and the vacuum device.

In this form the vacuum draw of the assembly may be set to accomodate the desired pressure drop across the filter element, controlling the necessary negative pressure levels inside the frame skirt to limit unwanted migration of dust. At the same time, the frame skirt may be lined with a removeable paper liner, to collect the accumulation of fixative laden debris.

DESCRIPTION OF THE PREFERRED EMBODIMENT

Figure 1:
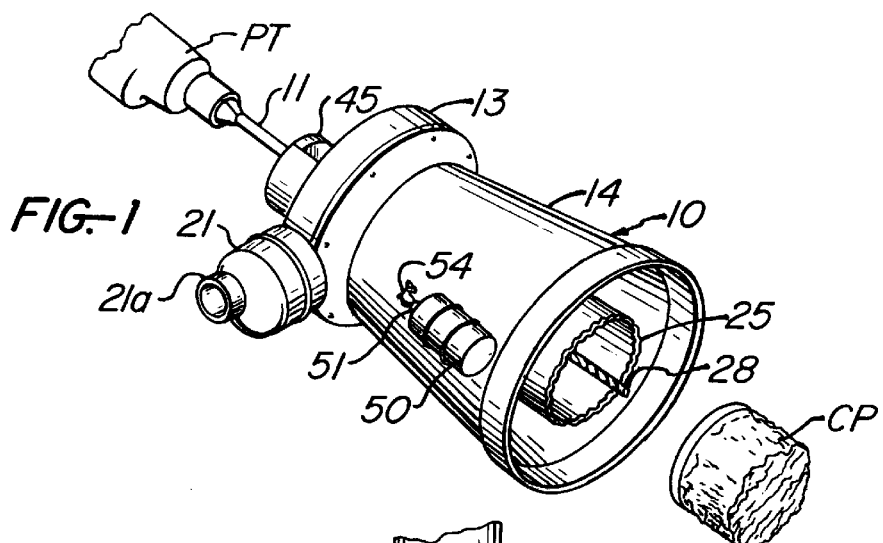
FIG. 1 is a perspective illustration, separated by parts, of the inventive cutter assembly.
Figure 2:
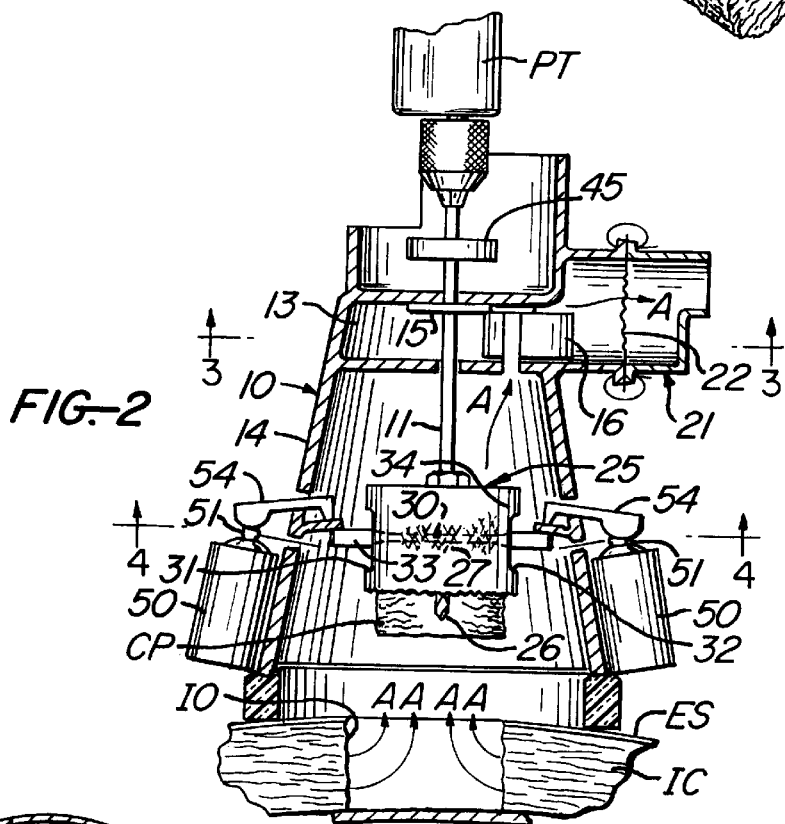
FIG. 2 is a sectional side view of the inventive cutter assembly shown in FIG. 1.
Figure 3:
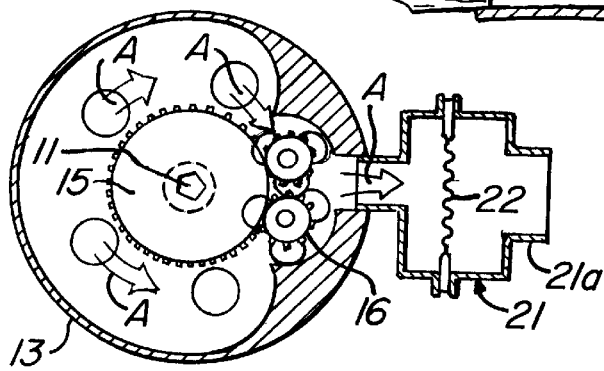
FIG. 3 is a sectional view taken along line 3—3 of FIG. 2.
Figure 4:
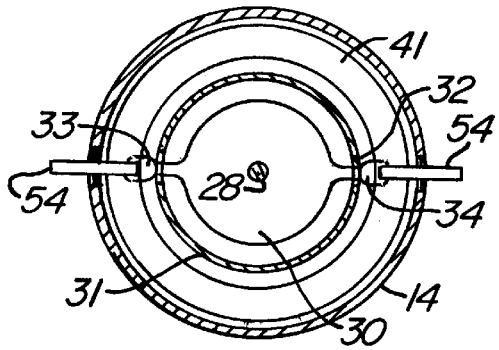
FIG. 4 is yet another sectional view taken along line 4—4 of FIG. 2.

As shown in FIGS. 1–4, the inventive cutting assembly, generally designated by the numeral 10, includes a keyed shaft 11 extending from the rotary output of a powered hand tool PT, shaft 11 passing into the interior of a hollow frame shield 12. Shield 12 is generally frustoconical in form, defined by an upper chamber 13 and a lower chamber 14, both coaxially aligned with the axis of shaft 11. Fitted in the interior of chamber 13 is a central drive gear 15, keyed for sliding engagement with shaft 11 and geared to advance in rotation a vane set 16. Thus the rotary advancement of the shaft concurrently drives in rotation the vane set, at a gearing ratio selected by the ratio of the drive gear and the driven gear.

This vane set then effects an evacuation pump, drawing the air A from the interior of the lower chamber 14 into a filter housing 21 on one side of the upper chamber 13, and across a filter element 22. The drawing rate of this air pump is selected by the above gearing ratio, and replacement of the element 22 is effected by separation of the housing 21. Thus as the shaft 11 is turned air flow is concurrently developed into the filter housing, drawing any dust, shavings, and particulate matter in chamber 14 onto the filter element 22, along the airflow arrows A.

Shaft 11, moreover, extends into chamber 14 to engage a hole cutter assembly 25 at the end thereof, comprising a cylindrical blade 26 knurled on the exterior in a knurled strip 27 and including a pilot drill 28 at its center. A pair of opposed vertical slots 31 and 32 in the surface of blade 26 receive transverse posts 33 and 34 extending from a circular disc 30 in the blade interior. Thus as blade 26 cuts through the exterior skin ES of the insulation cladding IC, disc 30 is lifted along with its posts 33 and 34. This lifting translation is then opposed by an interior projection 41 inside the lower chamber 14, and on withdrawal of the blade the interferance of the posts against projection 41 ejects the cut plug CP from the blade while flexing the projection. A single reciprocal stroke of the shaft 11 and the cutter thereon thus forms an inspection opening IO and also ejects the plug CP on withdrawal.

To limit the depth of cut of the foregoing cutting cycle, shaft 11 is provided with an adjustable collar 45 which opposes the axial advancement of the shaft on contact with the upper surface of chamber 13. Thus the engagement selection of the collar on the shaft determines the depth of the cut. The user, therefore, makes a single depth selection corresponding to the cladding thickness of the vessel that requires inspection access.

The prior use of asbestos in the cladding layers, however, generates asbestos dust in the course of cutting, which even when collected on the filter element still poses health risks to the operator in the process of disposal. At the same time, the process of inspection is followed by the replacement of the plug CP, again exposing the operator to asbestos contact. To mitigate these risks, one or more fixative spray disponser 50 is fitted to the exterior of the chamber 14, directing a spray nozzle 51 into the chamber interior, each such nozzle being articulated by a pivotal member 54 pivoted at the chamber wall to engage the upward flexure of projection 41. Thus the withdrawal stroke is accompanied by fixative spray dispensing, which coats the plug exterior and concurrently deposits on the filter element. In this manner all the asbestos contamination sources are stabilized by the fixative, minimizing exposure and health risks to those engaged in the task.

Of course, various other parts are required to effect convenience, as for example a resilient ring 61 to mate the skirt forming chamber 14 to the cladding exterior. Similarly, a variety of fastening devices 62 may be used to effect closure of the filter cavity, and various slip surfaces may be applied at the several contact points described herein.

Figure 5:
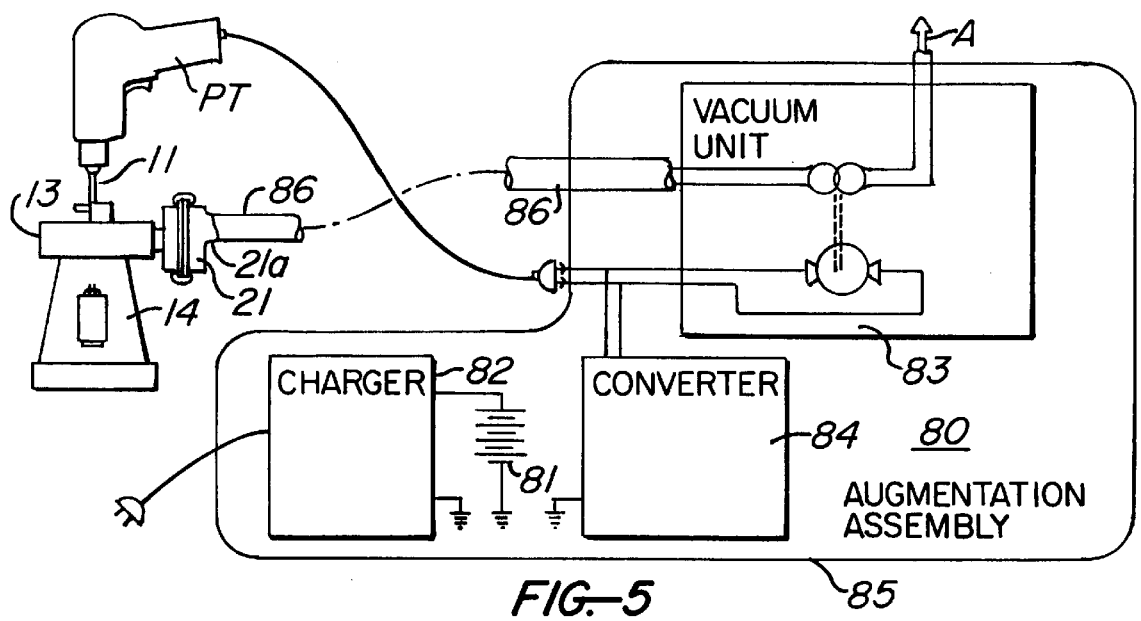
FIG. 5 is a diagrammatic illustration of the inventive assembly shown in FIGS. 1–4, in combination with an external vacuum device and a battery for providing portable operation.
Figure 6:
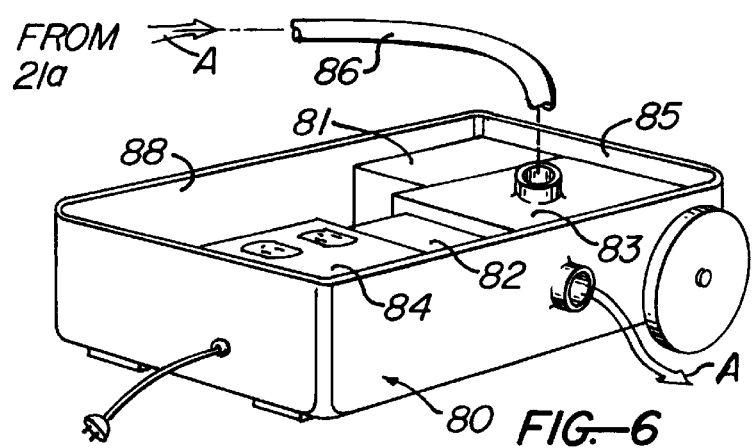
FIG. 6 is a perspective illustration of the inventive combination shown in FIG. 5, conformed for transport to a remote site.

The foregoing inventive assembly may be augmented in the air volume that is drawn across the filter element 22, and concurrently may be rentered portable and useful at a remote location, by way of an augmentation assembly shown in FIGS. 5 and 6, and generally designated as 80. Assembly 80 comprises a battery 81, a charger 82, a vacuum unit 83, and a converter 84 for producing local power to the tool PT. All these items may be stored in a carrying case 85 which also includes a storage cavity 88 for the tool PT and a flexible vacuum hose 86 useful in connecting an outlet port 21a on housing 21 to the vacuum unit 83. Thus the air flow across element 22 can be augmented, increasing the capacity of particulate matter that may be collected on the element 22, in a structure that can also serve as the local power source. The charger 82 can then be used for periodic recharging of the battery, and the converter 84 is included to adapt in known manner the DC battery output to the AC power requirements of conventional forms of the tool PT and the vacuum unit 83. The inventive hole cutting assembly is thus rendered conveniently portable and expanded in useful capacity by way of this further adaptation.

Figure 7:
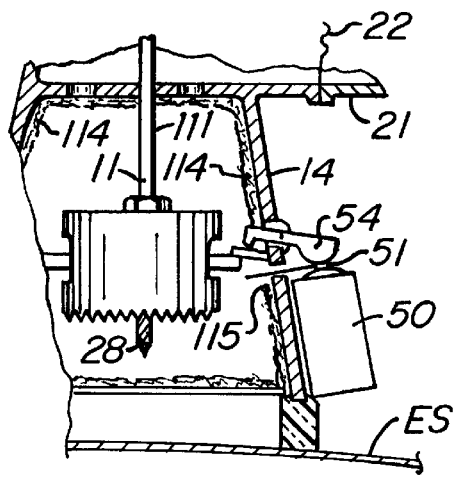
FIG. 7 is a detail view of the skirt structure useful in the invention herein including a collection liner for absorbing the bulk of the particulate matter in the course of use.

By reference to FIG. 7, the cutting particle and debris accumulation capacity of the inventive assembly may be further improved by a disposable liner 114 that may be insertable into the interior of the chamber or skirt 14. Liner 114 may be formed of a fibrous material structure provided with cut-outs 115 and 111 to accomodate the nozzle 51 and shaft 11 while acting as a coarse collection screen that shields the remaining interior surfaces from debris accumulation. The same coarse, fibrous nature of the liner 114 is also useful as the primary coarse collection mechanism to protect the filter element 22, extending the effective filter capacity. Moreover, the discardable nature of the liner 114 and filter element 22, when combined with the fixative spray, effectively confine the asbestos particulate matter for disposal.

The detailed execution of the foregoing, in light of these teachings, is thus a matter of knowledge of those skilled in the art. Obviously, many modifications and variations can be effected without departing from the spirit of the instant invention. It is therefore intended that the scope of this invention be determined solely by the claims appended below.

What is claimed is:

1. A powered cutter assembly for use in forming inspect on apertures in insulation cladding, comprising:

a portable source of rotary power, including an output shaft driven in rotation by said source;

a generally frustoconical hollow enclosure conformed for sliding engagement to said source and adapted to receive said shaft generally coaxially therein, said enclosure including an upper chamber disposed in axial alignment above a lower chamber, said shaft extending through said upper chamber and into said lower chamber to engage a hole cutting assembly therein;

a filter housing communicating with said upper chamber and including a removable filter element therein;

an air pump received in said upper chamber and engaged for operation to said shaft, for drawing air from said lower chamber into said filter housing;

limit means selectively engageable to said shaft intermediate said source and said upper chamber, for limiting the extension of said shaft into said lower chamber;

dispensing means deployed on said lower chamber and conformed for selective communication into the interior thereof, for expelling a fixative spray into said lower chamber upon the dispensing articulation thereof; and articulation means operatively connected to said shaft and said dispensing means for effecting the dispensing articulation of said dispensing means upon the withdrawal articulation of said shaft.

2. Apparatus according to claim 1, wherein:

said cutter assemnbly includes a cylindrical cutter blade deployed coaxially on the free end of said shaft.

3. Apparatus according to claim 2, wherein:

said cutter blade includes opposed longitudinal slots, and a disc received in the interior of said blade provided with diametrically extending posts projecting through said slots; and said lower chamber includes an interior radial lip extending to oppose the upward translation of said posts.

4. Apparatus according to claim 2, wherein:

said blade includes a knurled exterior surface.

5. Apparatus according to claim 1, further comprising:

a resilient sealing lip formed on the distal end of said lower chamber, for effecting sealing contact with said insulation cladding.

6. A powered cutter assembly for use in forming inspection apertures in insulation cladding, comprising:

a portable source of rotary power, including an output shaft driven in rotation by said source;

a generally frustoconical hollow enclosure conformed for sliding engagement to said source and adapted to receive said shaft generally coaxially therein, said enclosure including an upper chamber disposed in axial alignment above a lower chamber, said shaft extending through said upper chamber and into said lower chamber to engage a hole cutting assembly therein;

a filter housing communicating with said upper chamber and including a removable filter element therein;

vacuum means connected to said filter housing for evacuating air thereform;

dispensing means deployed on said lower chamber and conformed for selective communication into the interior thereof, for expelling a fixative spray into said lower chamber upon the dispensing articulation thereof; and articulation means operatively connected to said shaft and said dispensing means for effecting the dispensing articulation of said dispensing means upon the withdrawal articulation of said shaft.

7. Apparatus according to claim 6, further comprising:

a portable enclosure for storing said vacuum means and a battery, said enclosure including a conduit for connecting said vacuum means to said filter housing.

8. Apparatus according to claim 7, wherein:

said cutter assembly includes a cylindrical cutter blade deployed coaxially on the free end of said shaft.

9. Apparatus according to claim 8, wherein:

said cutter blade includes opposed longitudinal slots, and a disc received in the interior of said blade provided with diametrically extending posts projecting through said slots; and said lower chamber includes an interior radial lip extending to oppose the upward translation of said posts and a removeable fibrous liner deployed over the interior surfaces thereof.

* * * * *